United States Patent [19]

Schwartz

[11] Patent Number: 5,206,697

[45] Date of Patent: Apr. 27, 1993

[54] TUNABLE LASER RANGEFINDER AND METHOD

[75] Inventor: William C. Schwartz, Orlando, Fla.

[73] Assignee: Schwartz Electro Optics, Inc., Orlando, Fla.

[21] Appl. No.: 599,715

[22] Filed: Oct. 19, 1990

[51] Int. Cl.$^5$ .......................... G01C 3/08; G01S 13/08
[52] U.S. Cl. ........................................... 356/5; 342/131
[58] Field of Search .................... 356/5, 28.5; 342/131

[56] References Cited

U.S. PATENT DOCUMENTS

| | | | |
|---|---|---|---|
| 3,110,897 | 11/1963 | Laurent | 342/131 |
| 3,437,820 | 4/1969 | Thompson, Jr. et al. | 356/5 |
| 3,487,406 | 12/1969 | Howard | 342/131 |
| 4,184,767 | 1/1980 | Hughes et al. | 356/5 |
| 4,552,456 | 11/1985 | Endo | 356/5 |
| 4,915,499 | 4/1990 | Gidon et al. | 356/28.5 |
| 4,928,152 | 5/1990 | Gerardin | 356/5 |

Primary Examiner—Stephen C. Buczinski
Attorney, Agent, or Firm—Allen, Dyer, Doppelt, Franjola & Milbrath

[57] ABSTRACT

A tunable laser rangefinder having a wavelength tunable transmitter output and a wavelength tunable receiver that matches the transmitter wavelength. The transmitter provides laser energy output pulses that are reflected off a target and received by the receiver. The time between the transmitter pulse and the receiver pulse is determined and the range of the target is calculated. The transmitter and receiver frequencies are changed from pulse to pulse to provide good countermeasure immunity. In a preferred embodiment the rangefinder uses a solid state, reliable cobalt magnesium fluoride laser to provide laser energy in a region of the infrared spectrum which is eye safe and has good atmospheric transmission.

18 Claims, 4 Drawing Sheets

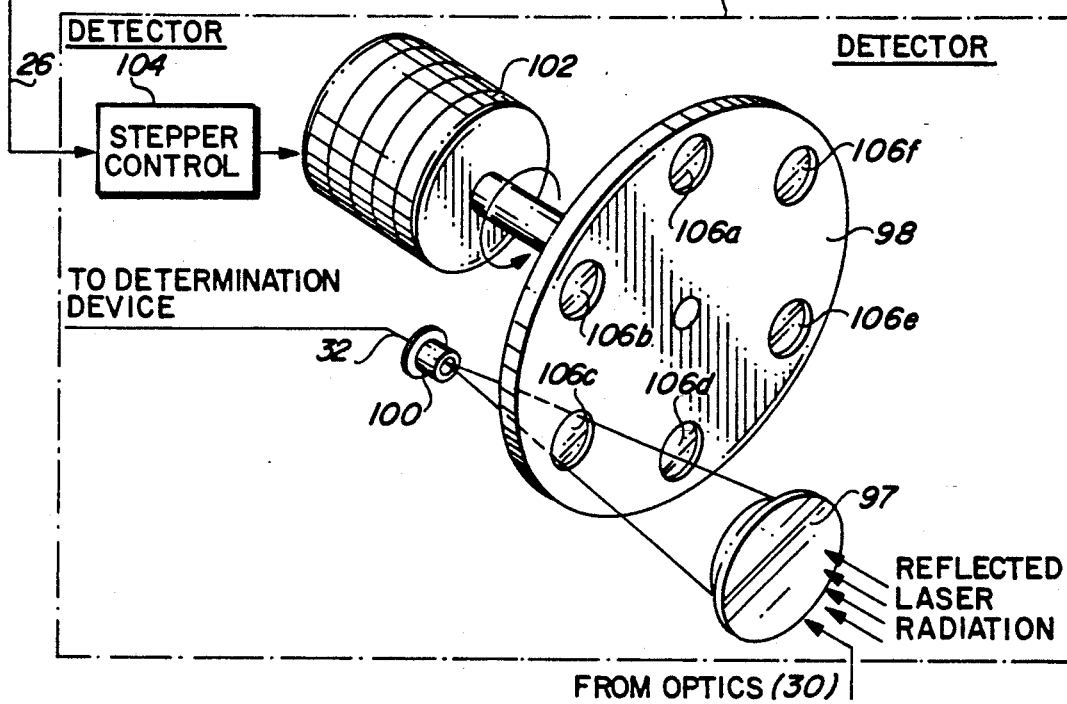
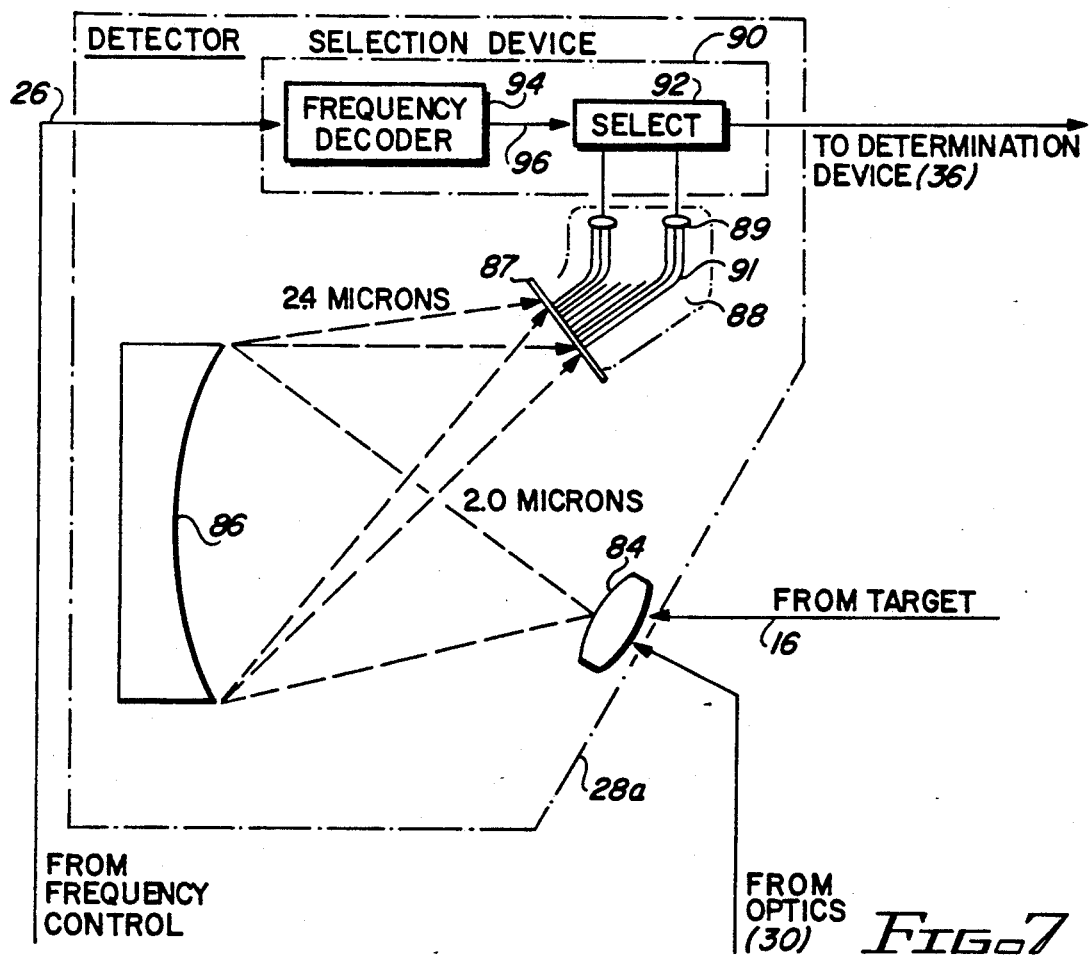

TUNABLE LASER RANGEFINDER AND METHOD

BACKGROUND OF THE INVENTION

This invention relates to laser systems and methods, and more particularly, to a laser rangefinder for determining the distance between a reference and a target using pulses of coherent light at varying frequencies.

Various prior art rangefinders have employed coherent light i.e. laser energy to determine target locations. These rangefinders employ a laser medium, such as neodymium YAG, to generate a laser energy pulse. A portion of the laser pulse energy is fed, through a minimum distance path, directly to the rangefinder receiver and a portion of the laser pulse energy is directed to the target to produce a reflection energy, a portion of which is also directed back to the rangefinder receiver. Fiber optic coupling is often utilized for the direct, minimum distance path transmission medium for the initial energy to the range finder receiver; however, any suitable transmission medium may be utilized.

The receiver responds to the directly fed and reflected inputs with electrical signals whose temporal characteristics represent the time required for the laser energy to travel to the target and back from the target to the rangefinder. The laser rangefinder utilizes time of arrival techniques to compute the distance to the target.

A drawback to prior art rangefinders is that the emission frequency is always narrowly centered about the primary frequency of the laser medium. This emission frequency can be detected by equipment located at the target. Consequently, an electronic countermeasure system can transmit an energy signal at the same frequency as the laser rangefinder to defeat the operation of the rangefinder.

An additional drawback, for some prior art rangefinders, exists in the manner in which the human eye reacts to energy contained within the near infrared spectrum (i.e. up to 1.4 microns). The eye does not detect, recognize, or respond to this spectrum (between 0.7 microns and 1.4 microns) of input; however, the lens of the eye will pass this spectrum with little attenuation to the retina. The lens reacts with this spectra of input, to provide considerable energy concentration to the area of the retina illuminated. In this fashion, the retina is at risk of damage.

Known atmospheric effects, where aerosols are suspended, and where temperature and humidity vary, produce varying transmission for laser energy. As these variations occur, a specific spectral frequency may experience greatly reduced transmission, while yet another specific spectral frequency may experience greatly increased transmission. Prior art laser rangefinders with fixed spectral frequency emission are unable to adjust to accommodate these atmospheric conditions.

Some prior art laser rangefinders suffer reduced performance at high pulse repetition frequencies, due in most part to thermally induced lensing in the laser medium. These rangefinders produce a temperature gradient across the laser medium due primarily to the high pump excitation requirement for the laser medium, and the inability of the coolant mechanism to extract the resultant waste heat. In view of the limited pulse repetition frequency available for these rangefinders, the available target position data rate is often inadequate to characterize the target motion.

SUMMARY OF THE INVENTION

It is an object of this invention to provide an improved laser or coherent light rangefinder.

Another object of this invention is to generate tracking pulses with a laser rangefinder that can shift wavelength with each successive pulse. Therefore, an optical countermeasure cannot lock onto the rangefinder's pulse wavelength.

An additional object of this device is to provide an improved method of using a rangefinder to determine distance between a reference point and a target location with coherent light energy.

A further object of this invention is to tune a laser rangefinder within the invisible, infrared spectrum to radiate a laser output that is not harmful to the retina.

Also, an object of this invention is to provide a laser rangefinder with a broad spectral range that can be tuned to varying wavelengths for different atmospheric conditions.

Another object of this invention is to determine the range of a target using a cobalt magnesium fluoride laser in a rangefinder to be able to tune the laser to a band of wavelengths in the invisible, infrared spectrum.

It is also an object of this invention to provide a rangefinder that can be tuned to a clear atmospheric window to allow extended rangefinder tracking range in the invisible, infrared spectrum.

It is also an object of this invention to provide high pulse rate laser pulses while changing the wavelength output of the rangefinder output pulses at a repetitive pulse rate adequate to characterize target motion.

These and other objects are provided with the apparatus for determining the range for a target from a reference location, the apparatus comprising means disposed at the reference location for transmitting a pulse of coherent light energy having a first predetermined wavelength at the target such that the coherent light energy reflects off the target, means for detecting the reflected coherent light energy having the first predetermined wavelength, and means responsive to the transmitting means and reflected coherent light energy pulse detected by the detecting means for determining the distance between the target and the reference location. The apparatus also includes means for changing the wavelength of the coherent light energy pulse directed at the target from a first predetermined wavelength to a second predetermined wavelength, means for changing the wavelength that the detecting means detects the coherent light energy pulse from the first predetermined wavelength to the second predetermined wavelength, and means for determining the distance between the target and the reference location at both the first wavelength of the coherent light energy pulse and the second predetermined wavelength. It is preferable that the coherent light energy be generated with a cobalt magnesium fluoride laser to allow the wavelength of the laser energy output to be tuned for varying atmospheric conditions.

Changing the wavelength of the coherent light energy of the rangefinders coherent light energy output makes countermeasuring of the laser rangefinder extremely difficult. It may be preferable that the apparatus coherent light energy be generated with a solid state laser crystal such as a cobalt magnesium fluoride crystal to improve reliability of the laser itself and to allow tuning in the infrared invisible spectrum (1.6 microns to 2.5 microns wavelength) to prevent harm to the eye.

Also, by tuning in this band, the coherent light can be detected without requiring a cryogenically cooled receiver. It may also be preferable that the wavelength changing means changes the wavelength of the coherent light energy after every pulse is directed at the target to provide good countermeasure immunity.

Alternately these objects may be accomplished in a method for determining the distance between a laser source and a target comprising the steps of transmitting coherent light energy having a first wavelength from a laser source directed at the target such that the coherent light energy is reflected off the target, detecting when the coherent light energy at the first wavelength is transmitting from the laser source and when the coherent light energy reflects from the target, and changing the wavelength of the coherent light energy directed at the target from a first wavelength to a second wavelength. The method further comprises the steps of detecting when a coherent light energy at the second wavelength is transmitted from the laser source and when the coherent light energy reflects from the target to determine the distance between the laser source and the target. The method may further comprise the step of determining the time interval for the coherent light energy at the first wavelength to be fed from the source and reflect off the target, and determining the time interval for the coherent light energy at the second wavelength to be fed from the source and reflect off the target. It may be preferable that the method further comprise the step of changing the time interval that the coherent light energy is transmitted to the target to a predetermined rate to prevent the rangefinder's pulse from being locked onto with electronic countermeasure equipment.

DESCRIPTION OF THE FIGURES

FIG. 5 is a simplified schematic diagram of the laser rangefinder detector shown in FIG. 1;

FIG. 6 is a plot of the tuning curve for the acoustic optic tuning filter in FIG. 5 showing the optical wavelength as a function of the frequency of the controller output signal;

FIG. 7 is a schematic diagram of an alternate embodiment of the rangefinder detector shown in FIG. 5; and FIG. 8 is a diagram of a second alternate embodiment of the rangefinder detector shown in FIG. 5.

DESCRIPTION OF THE PREFERRED EMBODIMENTS

Figure 1:
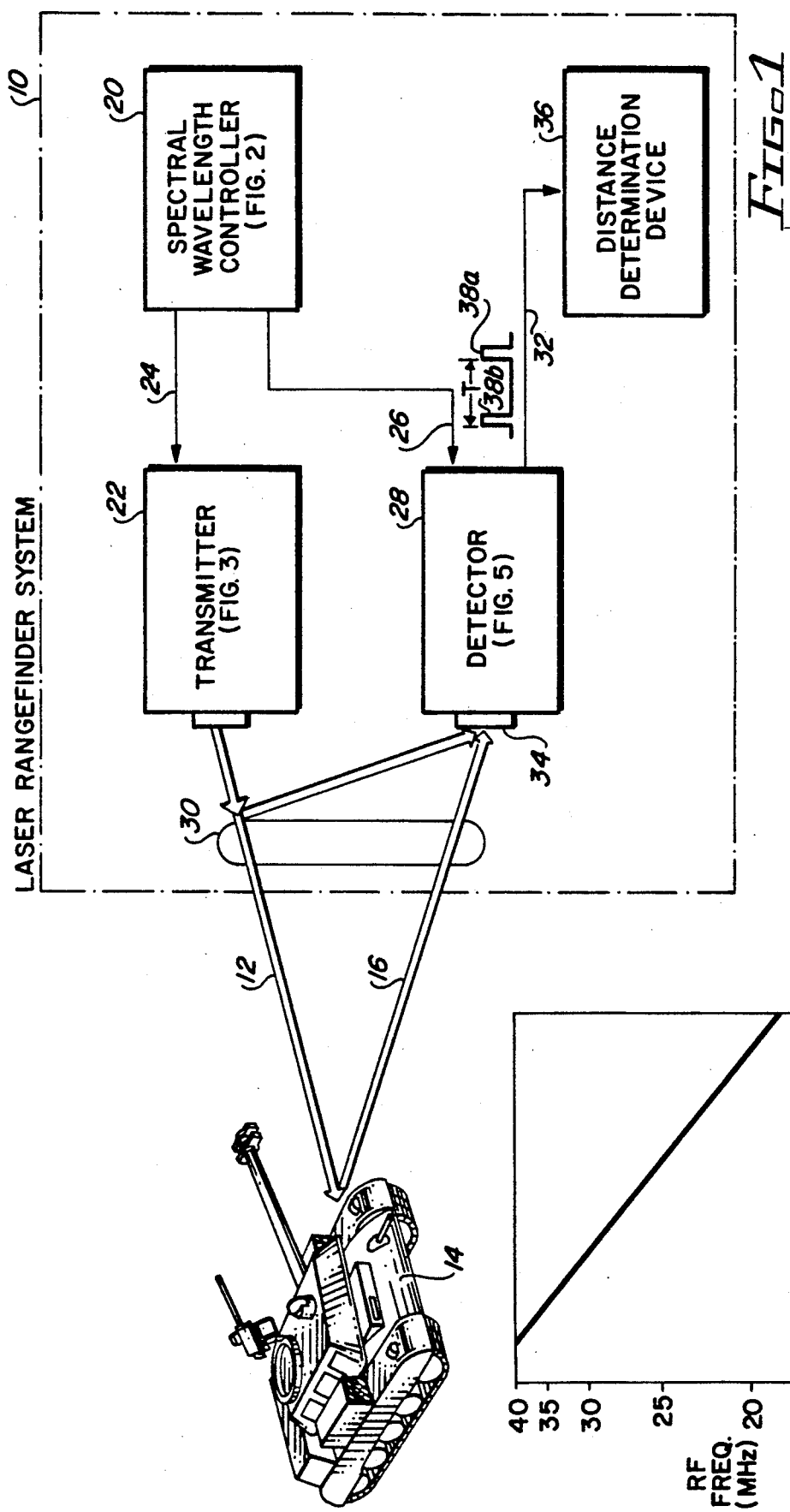
FIG. 1 is a block diagram of the laser rangefinder system with the rangefinder at a reference point and a target located a distance away from the reference point.

Referring to FIG. 1 there is shown a laser rangefinder system 10 having a transmitter 22 directing pulses of coherent light energy, also referred to hereafter as laser energy, on output 12 at a target 14. The pulses are transmitted at a predetermined pulse repetition rate. Laser rangefinder system 10 then receives reflected coherent light energy 16 from target 14.

Laser rangefinder system 10 includes a spectral wavelength controller 20 that provides a signal to transmitter 22 over line 24 to indicate the wavelength of the coherent light energy pulse on output 12. Spectral wavelength controller 20 also provides a signal on line 26 to detector 28 having a frequency corresponding to the frequency of the signal that was provided to transmitter 22 on line 24.

Transmitter 22 feeds coherent light energy pulses through optics 30 to output 12. The coherent light energy wavelength is set by the frequency of the signal being fed on line 24 from spectral wavelength controller 20. Part of the light energy is reflected onto input broadband filter 34 from optics 30. Coherent light energy may be fed to detector 28 with an optical fiber or similar device from transmitter 22 to input broadband filter 34, rather than by being reflected off of optics 30. Detector 28 feeds a signal onto line 32 when coherent light energy is reflected from optics 30 to input broadband filter 34, and when reflected coherent light energy 16 is received at input broadband filter 34. Detector 28 only feeds signals onto line 32 when either the frequency of the coherent light energy from optics 30 or coherent light energy 16 matches the frequency of the signal being fed on line 26. The signal being fed on line 32 includes pulses 38a and 38b. Pulse 38a corresponds to the coherent light energy from optics 30 and pulse 38b corresponds to the filtered signal of reflected coherent light energy 16. The time interval T between the start of pulse 38a and the start of pulse 38b is proportional to the distance between laser rangefinder system 10 location and target 14.

Distance determination device 36 is fed pulses 38a and 38b through line 32. In response to pulses 38a and 38b, distance determination device 36 computes time interval T, the time between pulses 38a and 38b. Distance determination device 36 then computes the distance from a reference location to target 14 location using conventional electronics by the formula $TC/2=D$, where C is the speed of light and D is the distance between the target and the reference location. This computed distance may be displayed on a screen or fed to a computer system for further processing.

Figure 2:
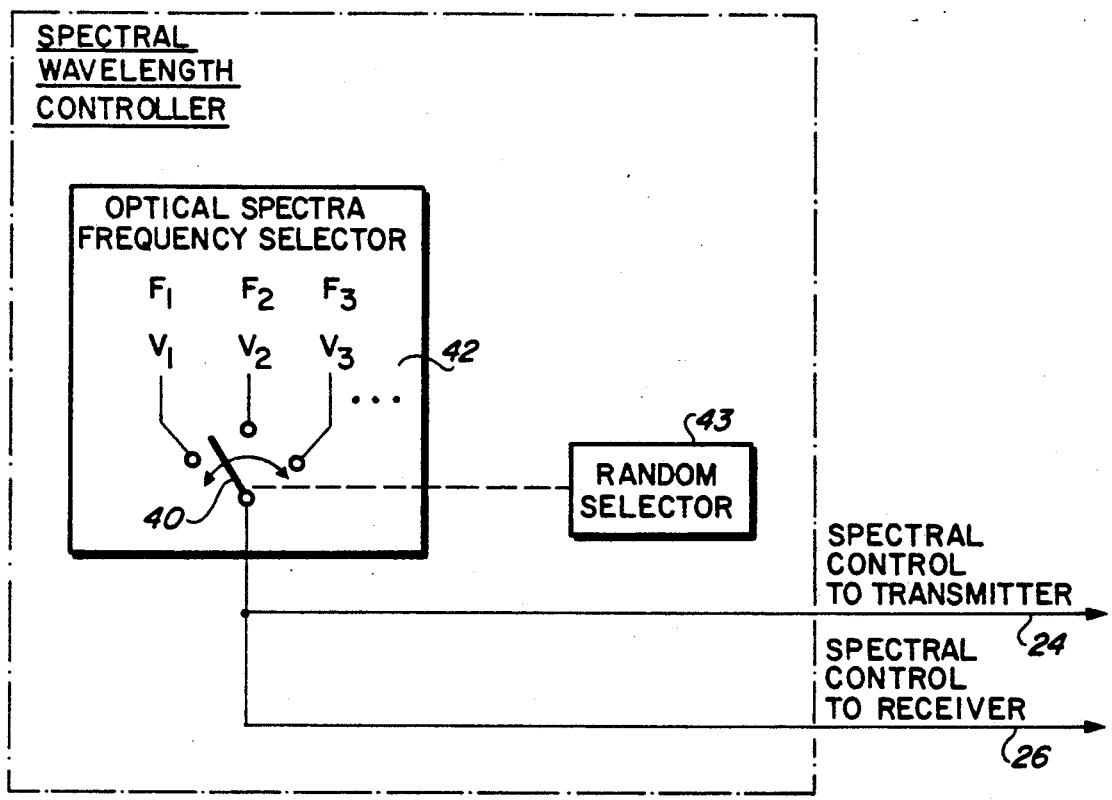
FIG. 2 is a simplified schematic diagram of the spectral wavelength controller shown in FIG. 1.

Referring to FIG. 2, there is shown spectral wavelength controller 20 that includes a frequency controller 39 having a frequency selector 42 and for providing frequency signals to transmitter 22 and detector 28 (FIG. 1). A frequency (shown here as $F_1, F_2, F_3, \ldots$) is selected by a switch 40 within frequency selector 42 coupling a voltage level ($V_1, V_2, V_3, \ldots$) to lines 24 and 26, as shown. Although only three frequencies are shown, the number of frequencies may be extremely large, limited only by the spectral bandwidth of the laser transmitter and the spectral resolution of the receiver.

Spectral wavelength controller 20 also includes a random selector 43 to randomly select the frequency and corresponding wavelength of output 12. Spectral wavelength controller 20 can change the position of switch 40 to select a different frequency ($F_1, F_2, F_3, \ldots$) after each transmitted coherent light energy pulse.

Pulse repetition rates between 3 and 50 Hz are preferred to allow the rangefinder to track the target. It is critical, however, that the control and selection of the output of frequency selector 42 be fed on lines 24 and 26 to provide synchronization between the transmitter and receiver for each and all range measurement events. Alternately, an equivalent device such as a digital to analog converter (not shown) may be substituted for frequency selector 42 and be programmed by a microprocessor to feed a random voltage level onto lines 24 and 26.

Each frequency ($F_1$, $F_2$, $F_3$, ...) has an associated voltage level ($V_1$, $V_2$, $V_3$, ...). When a voltage level is selected by frequency selector 42, that voltage level is fed onto line 24 to transmitter 22 and on to line 26 to detector 28. For example, when frequency $F_1$ is selected, voltage level $V_1$ is coupled to lines 24 and 26 with switch 40.

Figure 3:
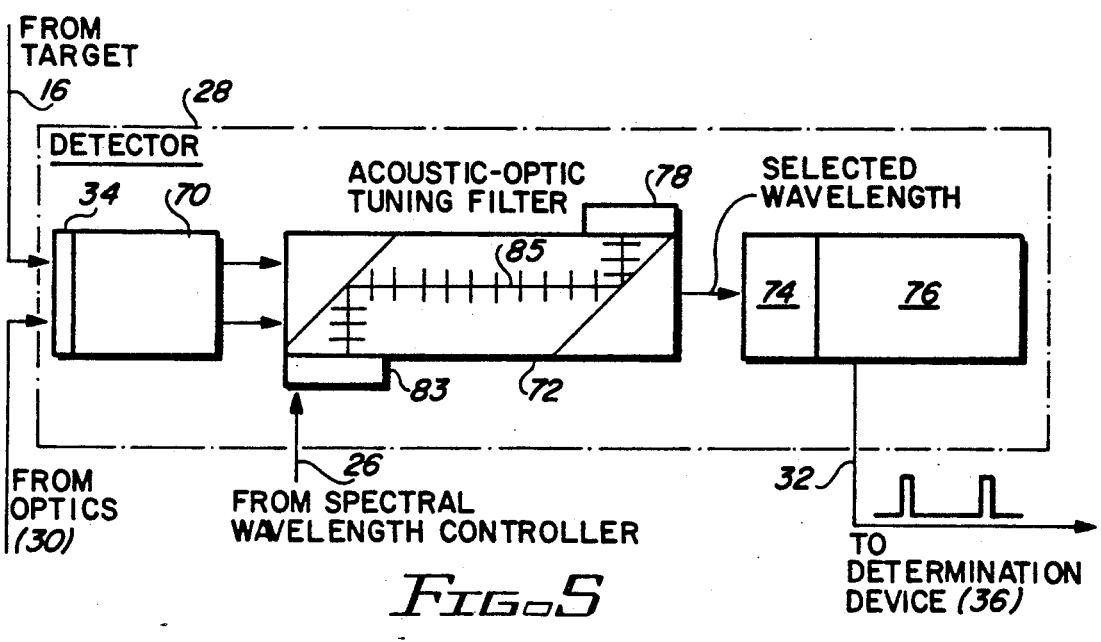
FIG. 3 is a simplified schematic diagram of the transmitter shown in FIG. 1.
Figure 3:
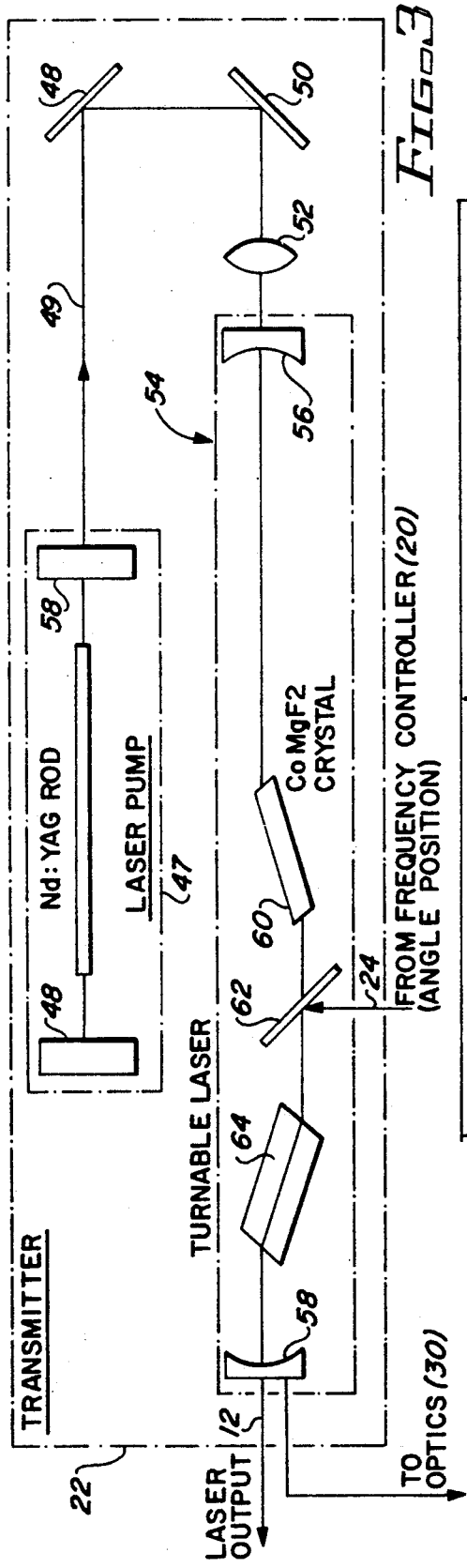

Referring to FIG. 3, there is shown the transmitter 22 having a laser pump 47 feeding coherent light energy on output 49. The light energy is then steered by reflectors 48 and 50 and by focusing lens 52 into tunable laser 54. Focusing lens 52 focuses the laser energy beam to cobalt magnesium fluoride crystal 60. Cobalt magnesium fluoride crystal 60 responds to laser energy fed from laser pump 47 by producing a predetermined wavelength of coherent light energy. This predetermined wavelength of coherent light energy is then fed to output 12 and optics 30.

Laser pump 47, preferably of the type neodymium YAG having an output at 1.3 micron wavelength, feeds coherent light to output 49. Laser pump 47 provides a population inversion drive for tunable laser 54. This energy output 49 may exist as a continuous wave excitation; however, the preferred energy output is a pulsed excitation. The coherent light energy on output 49 is then fed through a focusing lens 52 to cobalt magnesium fluoride laser 60.

Tunable laser 54 includes a mirror set that has a high reflector 56 and a partial reflector 58. High reflector 56 is preferably coated to achieve high reflectivity (near 100%) for a laser wavelength spectrum of 1.6 $\mu$m to 2.6 $\mu$m, while offering high transmission below the 1.4 $\mu$m spectrum. Partial reflector 58 is preferably coated to achieve a slightly lower reflectivity, typically 98% in the 1.6 $\mu$m to 2.0 $\mu$m wavelength. The coating of the mirror set limits the reflectivity wavelength band of laser energy. Accordingly, mirror sets may be used to change the wavelength band of tunable laser 54 output. Between the high reflector 56 and partial reflector 58 are cobalt magnesium fluoride crystal 60, generally referred to as the laser media, birefringent tuning element 62 and Q-switch 64.

Cobalt magnesium fluoride crystal 60 stores the energy from laser pump 47 with a process termed population inversion. The energy may be fed to cobalt magnesium fluoride crystal 60 at its face surface, parallel surface or broadside surface. The output of the coherent light energy from cobalt magnesium fluoride crystal 60 is selected by birefringent tuning element 62.

Birefringent tuning element 62 is a passive (non-powered) optical element that serves to select the laser wavelength or spectral emission of the laser. Tuning element 62 achieves this selection through rotation within the tunable laser 54 gain path. Each specific angle relation to the gain path results in a specific spectral line at which lasing occurs. Tuning of cobalt magnesium fluoride lasers is possible only because these crystals exhibit wide response or wide bandwidth. The birefringent tuning element 62 allows only one spectral line to achieve gain; the location of this line is dependent upon the angle at which the light intercepts the tuning element.

Birefringent tuning element 62 includes two pizzo electric transducer (PZT) elements (not shown) which adjust the angle of birefringent tuning element 62 in response to changes in voltage levels on line 24 from spectral wavelength controller 20. Other elements may also be used to adjust the angle of the birefringent tuning element 62 such as a galvanometer device. Birefringent tuning element 62 is set to an initial angle and laser wavelength that may be changed by varying the voltage levels on line 24. An acoustic optic frequency filter could replace birefringent tuning element 62 to affect spectral line output.

Figure 4:
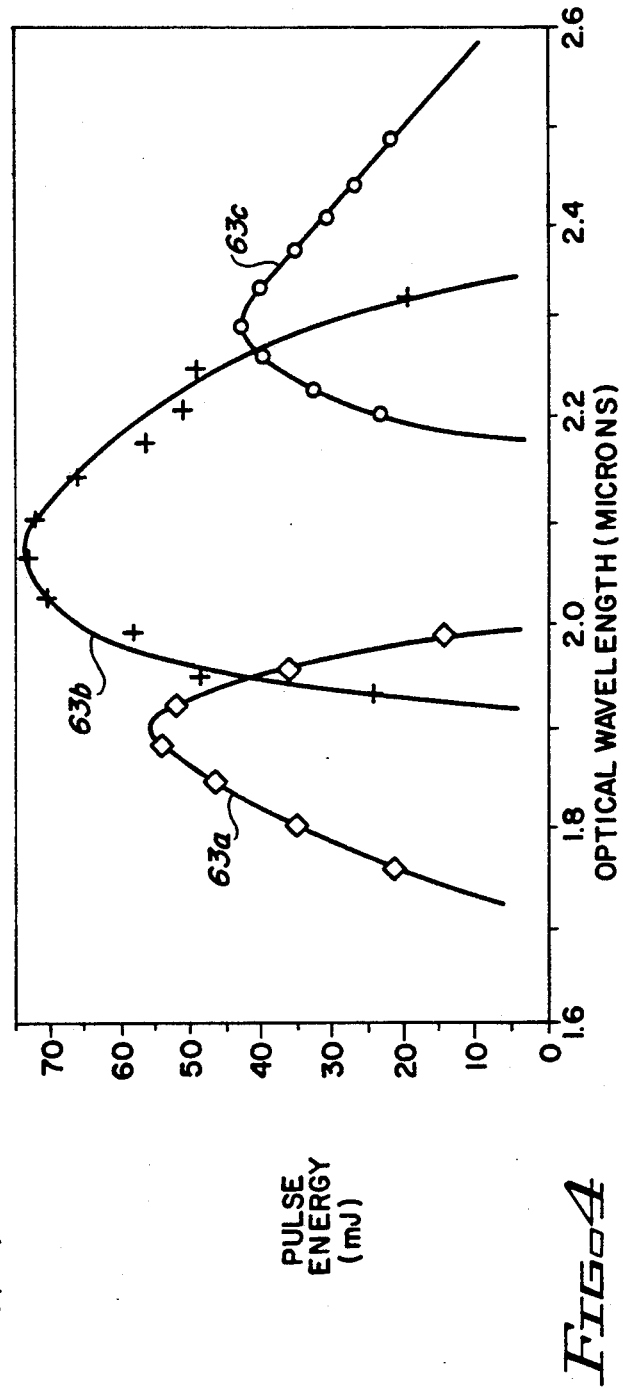
FIG. 4 is a graph of the tuning range of the transmitter shown in FIG. 3 for various birefringent tuning element alignments using three different resonator mirror reflectors coatings.

Referring to FIG. 4, there is shown a plot of three curves (63a, 63b and 63c). These curves plot varying output wavelengths of the laser energy from birefringent tuning element 62 as a function of three different mirror sets covering different wavelength bands. These wavelengths were plotted using a cobalt magnesium fluoride crystal 60 with the transmitter 22 shown in FIG. 3. The plots show that a different portion of the total spectral range is achieved for each mirror set. Curve 63a corresponds to a first mirror set, curve 63b corresponds to a second mirror set, and curve 63c corresponds to a third mirror set. Each point on curves 63a, 63b and 63c correspond to a different voltage level from spectral wavelength controller 20 with a given mirror set. It is recognized that the maximum laser energy output is reached when the laser energy wavelength is between 2.0 $\mu$m and 2.22 $\mu$m.

It is recognized that by using a cobalt magnesium fluoride crystal 60, laser energy wavelength may be provided in the invisible infrared spectrum at a reasonable output energy. Accordingly, the laser energy output of transmitter 22 would not be harmful to the retina if directly viewed because corneal light transmission is insignificant above 1.30 $\mu$m to 1.40 $\mu$m. Further, it is also recognized that the spectral transmittance of the earth's atmosphere at the frequencies between 2.0 $\mu$m and 2.4 $\mu$m is close to 100%, accordingly maximum range may be obtained with the rangefinder.

The optical output of the birefringent tuning element 62 is fed to Q-switch 64, such as an acousto-optic Q-switch or an electro-optic Q-switch. Electro-optic Q-switches provide a mechanism for enhancing the laser output by holding off (blocking) laser light polarized by a polarizer (not shown) from lasing until the laser inversion population is completely filled. The electro-optic Q-switch then releases all the energy in a very short pulse of high peak power by optically opening the resonator path. This is accomplished through removing or applying a high voltage drive to the electro-optic Q-switch. Application or removal of the high voltage drive allows the Q-switch 64 to perform as a low loss transmission medium. The acousto-optic Q-switch accomplishes the same results as electro-optic switch. These results are accomplished by changing the refractive angle of the laser light passing through the Q-switch by impressing an RF-signal on the Q-switch causing the laser beam to align with the resonator mirror.

It is to be noted that both the Q-switch 64 and the cobalt magnesium fluoride crystal 60 are configured for Brewsters angle cavity insertion. This configuration provides low surface reflection loss, with resulting high resonator gain, over a broad spectral range, in this case 1.6 $\mu$m through 2.6 $\mu$m. Q-switch 64 enhances laser energy from tunable laser 54 by narrowing the laser energy pulse width and increasing its peak power. Although an acoustic-optic Q-switch is specified, an electro-optic Q-switch would serve equally as well.

A portion of laser energy in tunable laser 54 passe through partial reflector 58 and out to either output 12 and optics 30. The partial reflector of reflector 58 is high enough to achieve a reasonable gain within laser 54, while allowing enough energy to "leak" to generate the laser emission.

Referring to FIG. 5, there is shown an expanded block diagram of detector 28 of FIG. 1. Detector 28 includes a polarizer 70, optically coupled through an acoustic-optic tuning filter 72, to photo detector 74 and transformation device 76. The output of this transformation device 76 is then fed on line 32 to distance determination device 36.

Polarizer 70 receives through input broadband filter 34 reflected coherent light energy 16 from target 14 and receives coherent light energy on optics 30 from transmitter 22. The coherent light energy 16 is then polarized by polarizer 70 from target 14 and the filtered by acousti-optic tuning filter 72.

Acoustic-optic tuning filter 72 includes telluride crystal 82, coupled to a lithium niobate crystal 83 using a high stress adhesive. When lithium niobate crystal 83 is electrically stimulated, a mechanical wave is produced, shown by line 85 in telluride crystal 82. This wave propagates through crystal 82 and is dissipated by acoustic termination 78. Lithium niobate crystal 83 is coupled to line 26. A discontinuity 80 is formed at the polarizer 70 end of telluride crystal 82, to fold the mechanical wave.

An electrical signal at a predetermined frequency is provided on line 26 to stimulate lithium niobate crystal 83, resulting in a mechanical wave being propagated on line 85. When the mechanical energy of the wave passes through the telluride crystal 82 on line 85, only the predetermined wavelength of laser energy from polarizer 70 passes through acoustic-optic tuning filter 72. Typical wavelengths passing through acoustic-optic tuning filter 72 as a function of the frequency of the signal on line 26 are shown in FIG. 6. The output of the acoustic-optic tuning filter 72 is optically coupled to photo detector 74 and transformation device 76.

It is recognized that an optical wavelength of the laser energy passing through detector 28 is synchronized with the optical wavelength of the laser energy from transmitter 22. Further, detector 28 may be quickly changed to pass through laser energy with a new optical wavelength by a simple frequency shift of the signal on line 26.

Photo detector 74 converts the optical signal output from acoustic-optic tuning filter 72 into an electrical signal that is read and amplified by transformation device 76. One such photo detector 74 is an indium gallium arsenide photo diode, Model No. ETX 100TL manufacture by Epitaxx, Inc. of Princeton, N.J. This particular photo detector 74 is adapted to receive laser energy in the wavelength bands of the cobalt magnesium fluoride crystal 60. The transformation device 76 converts the low level electrical output from the photo detector 74 into a high level electronic signal level pulse (such as 38a or 38b), which is then fed to distance determination device 36. The technique for converting this low level electrical pulse to a high level electrical pulse is known and has been used on prior rangefinders.

Referring to FIG. 7 there is shown an alternate detector 28a for selecting the wavelength of the received coherent light energy 16. This detector 28a includes an optic lens 84, optically coupling coherent light energy 16 from a target (not shown) to reflect off of reflective spectral grating 86 to fiber array 88. The output of fiber array 88 is coupled to selection device 90 and over line 32 to distance determination device 36. Selection device 90 is controlled by spectral wavelength controller 20 over line 26. Synchronization is done by selection of the appropriate fiber array 88 output and associated indium gallium arsenide or other photo detectors 89.

Optic lens 84 focuses coherent light energy 16 onto reflective spectral grating 86. Reflective spectral grating 86 directs the coherent light energy 16 from target 14 and optics 30 onto fiber array 88. The angle of direction corresponds to the spectral wavelength of the reflected laser light from the target. The range of wavelengths of the coherent light energy projected is preferably between 2.0 μm and 2.40 μm, although the range may be broadened to include wavelengths between 1.6 μm to 2.4 μm.

Fiber array 88 includes broadband interference filter 87 and a photo detector 89 such as an indium gallium arsenide diode. Broadband interference filter 87 filters coherent light energy projected onto fiber array 88 which then feeds the filtered light energy to fiber optic cables 91. Coherent light energy is then fed through a respective fiber array, corresponding to the wavelength of the light that was projected through broadband interference filter 87, to indium gallium arsenide or other photo detectors 89. Photo detectors 89 then feed the received detector electronic signal to selection device 90.

Selection device 90 contains a frequency decoder 94, coupled to a selector 92. Frequency decoder 94 decodes the signal from spectral wavelength controller 20 on line 26 and selects a detector 89 in accordance with the decoded signal. The output from frequency decoder 94, corresponding to the coherent light energy signal frequency to be selected, is fed to selector 92 on line 96. Selector 92 then passes onto line 32 a signal from one of photo detectors 89 corresponding to the signal on line 96.

Referring to FIG. 8 there is shown a second alternate detector 28b to select the wavelength of the optical wavelength that is to be detected. Detector 28b uses a stepper motor 102 and filter wheel 98 to select reflected bandlight energy from target 14 and from optics 30. The spectral selector granularity of an optical wavelength detected is a function of the number and bandwidth of filters utilized. Detector 28b includes optic lens 97 optically coupled through a filter wheel 98 to receiver photo detector device 100. Filter wheel 98 position is set by stepper motor 102. Stepper motor 102 position is controlled by stepper control 104.

Optic lens 97 focuses reflected coherent light energy 16 and transmitted coherent light energy through individual bandpass filter 106 (a-g) on filter wheel 98 to receiver photo detector device 100. The individual bandpass filter 106 allows a predetermined wavelength to pass through, preferably between 2.0 μm and 2.40 μm, although the range may be broadened to include wavelengths between 1.6 μm and 2.4 μm. Photo detector device 100 preferably contains a semiconductor material, such as indium gallium arsenide, that detects a broadband of coherent light and converts the coherent light into an electric signal. Receiver photo detector device 100 passes an electronic signal through line 32 to distance determination device 36 when a coherent light signal is detected.

Stepper control 104 is fed a signal having a predetermined frequency from spectral wavelength controller 20 on line 26. Stepper control 104 sends a signal to stepper motor 102 to set the position of stepper motor 102 and the bandpass filter 106 (a-f), in accordance with the predetermined frequency. The predetermined frequency will correspond to the wavelength of the coherent light energy directed at the target by transmitter 22 so that the transmitter and receiver wavelengths match.

This concludes the description of the preferred embodiments. A reading by those skilled in the art will bring to mind various changes without departing from the spirit and scope of the invention. It is intended, however, that the invention only be limited by the following appended claims.

What is claimed is:

1. An apparatus for determining the range of a target from a reference location, the apparatus comprising:
   means disposed at said reference location for transmitting a pulse of coherent light energy having a first predetermined wavelength at the target such that said coherent light energy reflects off said target;
   means for detecting said transmitted and said reflected coherent light energy pulse having the first predetermined wavelength;
   means for changing the wavelength of said coherent light energy pulse transmitted at the target from a first predetermined wavelength to a second predetermined wavelength;
   means for changing the wavelength that said detecting means detects said coherent light energy pulse from the first predetermined wavelength to the second predetermined wavelength; and
   means responsive to said light energy pulses detected by said detecting means for computing the distance between the target and said reference location at both the first predetermined wavelength of said coherent light energy pulses and the second predetermined wavelength.

2. The apparatus as recited in claim 1, wherein said coherent light energy pulse is generated with a cobalt magnesium fluoride laser.

3. The apparatus as recited in claim 1, wherein said tunable coherent light pulse is generated using a solid state crystal.

4. The apparatus as recited in claim 1, wherein said coherent light energy pulse is transmitted having a wavelength between 1.6 and 2.5 microns.

5. The apparatus as recited in claim 1, wherein said detecting means includes a photo diode comprising a gallium indium arsenide material.

6. The apparatus as recited in claim 1, wherein said pulse has a finite duration; and wherein said transmitting means transmits a plurality of pulses of coherent light energy at a predetermined pulse repetition rate.

7. The apparatus as recited in claim 6, wherein said wavelength changing means change the wavelength of said coherent light energy pulse after every pulse is transmitted at the target.

8. The apparatus as recited in claim 6, wherein said pulse repetition rate is greater than 3 Hz to provide tracking capability to the rangefinder.

9. A method for determining the distance between a laser source and a target, the method comprising the steps of:
   transmitting coherent light energy having a first wavelength above 1.6 μm from a laser source at the target such that said coherent light energy is reflected off said target;
   detecting when the coherent light energy at said first wavelength is transmitted from the laser source and when the coherent light energy reflects from the target;
   changing the wavelength of the coherent light energy transmitted at the target from a first wavelength to a second wavelength;
   detecting when the coherent light energy at the second wavelength is transmitted from the laser source and when the coherent light energy reflects from the target; and
   computing a target distance in response to coherent light detected at said first wavelength and coherent light detected at said second wavelength.

10. The method as recited in claim 9 further comprising the steps of:
    determining the time interval between when the coherent light energy at the first wavelength is transmitted from the source and when the coherent light energy at the first wavelength is reflected off the target; and
    determining the time interval between when said coherent light energy at said second wavelength is transmitted from the source and when the coherent light energy at the second wavelength is reflected off the target.

11. The method as recited in claim 9, further comprising the step of pulsing the coherent light energy at a predetermined pulse repetition rate.

12. The method as recited in claim 9, wherein said coherent light energy having a first wavelength and said light energy having a second wavelength are transmitted at a wavelength that is harmless to the retina and cornea of an eye.

13. The method as recited in claim 12 wherein the light energy is transmitted at a wavelength between 1.6 and 2.6 μm.

14. The method as recited in claim 9, further comprising the step of generating said coherent light energy with a solid state laser.

15. The method as recited in claim 14, wherein solid state laser includes a cobalt magnesium fluoride laser.

16. The method as recited in claim 9, further comprising the step of periodically changing the wavelength of said coherent light energy being directed at the target at a predetermined rate.

17. A tunable laser device comprising:
    a laser source having a cobalt magnesium fluoride laser with a tunable output wavelength adapted to generate a laser energy pulse at a first wavelength;
    means for detecting the laser energy pulse from the laser source when the pulse is generated at the first wavelength;
    means for transmitting the laser energy pulse from the laser source at a target such that the laser energy pulse reflects off the target;
    means for detecting laser energy pulse when said laser energy pulse is reflected off the target;
    means for tuning the output wavelength of said laser energy pulse generated with said laser source to a second wavelength different from said first wavelength after detecting said laser energy pulse reflected off the target;
    means for detecting the laser energy pulse from laser source when the pulse is generated at the second wavelength;

means for detecting the tuned laser energy pulse when said laser energy pulse tuned to said second wavelength reflects off said target;

means for determining the time interval between when said laser energy pulse generated at said first wavelength is detected from said laser source and when said reflected laser energy pulse is detected; and means for determining the time interval between when said laser energy pulse generated at said second wavelength is detected from said laser source and when said reflected laser energy pulse is detected.

18. The apparatus as recited in claim 17, wherein said tuning means tunes the output wavelength of the laser energy pulse to a different wavelength on successive transmitted laser pulses.

* * * * *